(12) United States Patent
Sloane et al.

(10) Patent No.: US 6,662,785 B1
(45) Date of Patent: Dec. 16, 2003

(54) METHOD OF OPERATING HCCI ENGINES AT LOW SPEED AND LOW LOAD

(75) Inventors: Thompson Milton Sloane, Oxford, MI (US); Ping-Ho Tsai, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/336,963

(22) Filed: Jan. 6, 2003

(51) Int. Cl.[7] .................................................. F02D 7/00
(52) U.S. Cl. ..................................... 123/481; 123/198 F
(58) Field of Search .............................. 123/481, 198 F, 123/198 DB, 90.15, 90.11, 295, 443; 701/104, 112

(56) References Cited

U.S. PATENT DOCUMENTS 6,390,054 B1 * 5/2002 Yang ........................... 123/295
6,561,145 B1 * 5/2003 Stockhausen et al. ..... 123/90.15
6,568,177 B1 * 5/2003 Surnilla ......................... 60/285

* cited by examiner

Primary Examiner—Hieu T. Vo
Assistant Examiner—Hai Huynh
(74) Attorney, Agent, or Firm—Kathryn A. Marra

(57) ABSTRACT

A method for operating a homogeneous-charge-compression-ignition (HCCI) engine at low speed includes the steps of monitoring the operating speed and load of the HCCI engine in a stable combustion condition. When the engine cylinder load drops below a predetermined value equal to the lowest allowed load at its current engine speed, at least one cylinder is deactivated to maintain the stable combustion in the remaining activated cylinders. When the cylinder load exceeds another predetermined value at its current engine operating speed, the cylinder is reactivated.

20 Claims, 2 Drawing Sheets

METHOD OF OPERATING HCCI ENGINES AT LOW SPEED AND LOW LOAD

BACKGROUND OF THE INVENTION

The present invention relates generally to control systems for internal combustion engines and, in particular, to a method for operating homogeneous charge compression ignition (HCCI) engines at low speed and low load.

Internal combustion engines, especially automotive internal combustion engines, generally fall into one of two categories, spark ignition engines and compression ignition engines. Traditional spark ignition engines, such as gasoline engines, typically function by introducing a fuel/air mixture into the combustion cylinders, which is then compressed in the compression stroke and ignited by a spark plug. Traditional compression ignition engines, such as diesel engines, typically function by introducing or injecting pressurized fuel into a combustion cylinder near top dead center (TDC) of the compression stroke. Both traditional gasoline engine and diesel engine combustion involve premixed or diffusion flames that are controlled by fluid mechanics. Each type of engine has advantages and disadvantages. In general, gasoline engines produce fewer emissions but are less efficient, while, in general, diesel engines are more efficient but produce more emissions.

More recently, other types of combustion methodologies or concepts have been introduced for internal combustion engines. One of these combustion concepts is known in the art as the homogeneous charge compression ignition (HCCI) engine, although in practice the intake charge is not necessarily homogeneous. HCCI is a distributed, flameless, autoignition combustion process that is controlled by the oxidation chemistry, rather than by fluid mechanics. In a HCCI engine, the intake charge is usually nearly homogeneous in composition, temperature, and residual level at the time of intake valve closing. The intake charge consists of a fuel/air mixture that is introduced into the combustion cylinder, as in spark-ignition engines, but the fuel/air mixture is heated prior to and/or during its introduction into the cylinder and, therefore, auto-ignites during the compression stroke, as in diesel engines but normally without the injection of fuel into the cylinder near TDC of the compression stroke. Because HCCI is a distributed kinetically controlled combustion process HCCI engines can, and indeed must, operate with a very dilute fuel/air mixture having a relatively low peak combustion temperature, thus forming extremely low NOx emissions. The fuel/air mixture for HCCI is relatively homogeneous, as compared to the stratified fuel/air combustion mixtures used in diesel engines, and, therefore, the rich zones that form smoke and particulate emissions in diesel engines are eliminated. Because of this very dilute fuel/air mixture, a HCCI engine can operate unthrottled with diesel-like fuel economy.

At medium engine speed and load, a combination of valve timing strategy and exhaust rebreathing (the use of exhaust gas to heat the intake charge entering a combustion space in order to encourage autoignition) during the intake stroke has been found to be very effective in providing adequate heating to the intake charge so that autoignition during the compression stroke leads to stable combustion with low noise. This method, however, does not work satisfactorily at or near idle speed and load conditions. As the idle speed and load is approached from a medium speed and load condition, the exhaust temperature decreases. At near idle speed and load there is insufficient energy in the rebreathed exhaust to produce reliable autoignition. As a result, at the idle condition, the cycle-to-cycle variability of the combustion process is too high to allow stable combustion. Consequently, one of the main difficulties in operating HCCI engine has been to control the combustion process properly so that robust and stable combustion with low emissions, optimal heat release rate, and low noise can be achieved over a range of operating conditions. The benefits of HCCI combustion have been known for many years. The primary barrier to product implementation, however, has been the in ability to control this process.

It is desirable, therefore, to provide a means for operating a HCCI engine efficiently and with stable combustion at low speeds and loads. It is also desirable to control the combustion process properly in a HCCI engine so that robust and stable combustion with low emissions, optimal heat release rate, and low noise can be achieved over a range of operating conditions.

SUMMARY OF THE INVENTION

The present invention concerns a method for operating a multi-cylinder homogeneous charge compression ignition (HCCI) engine at low engine speeds and loads. The method is performed on an operating HCCI engine having multiple activated cylinders. The method begins at the step of monitoring the engine operating speed and the individual cylinder loads of the HCCI engine having multiple activated cylinders in a stable combustion condition. The cylinder load is directly related to the rate of fuel addition to the cylinder, a quantity which is commanded by the engine performance control system to achieve desired vehicle performance, and which is the same for all active cylinders. The rate of fuel addition to the cylinder, therefore, is one measure of the cylinder load. Those skilled in the art, however, can appreciate that many means for measuring the cylinder load can be utilized while remaining within the scope of the present invention.

The decision on whether to activate or deactivate cylinders is based on an area of th e speed-load map of the engine where it has been previously determined that stable HCCI operation of the engine is possible. Both the engine speed and load of the engine, therefore, must be taken into account when deciding whether to activate or deactivate cylinders. Since the total engine load is equal to the sum of the loads on each of the individual cylinders, and the load on each active cylinder should be the same, it may be necessary to measure the load on only one active cylinder, or to compute an average over the active cylinders, in order to determine at which point the engine is currently operating on its speed-load map.

When the cylinder load drops below a predetermined value equal to the lowest allowed load at its current engine speed, at least one cylinder is deactivated and the fueling rate to the remaining active cylinders is increased to maintain the stable combustion in the remaining activated cylinders while satisfying the requirements of the engine control system. This predetermined value equal to lowest allowed load may be different for different engine speeds. When the active cylinder load exceeds another predetermined value at its current engine operating speed, the at least one cylinder is reactivated. This another predetermined value may be different for different engine speeds.

Preferably, the method according to the present invention utilizes an engine control system to monitor the speed and load of the cylinders, to activate the cylinders and to deactivate the cylinders. One means for deactivating the unneeded cylinders is to stop the flow of fuel and to keep both the intake and exhaust valves closed on the cylinders to be deactivated. This eliminates pumping losses due to intake into and exhaust from the deactivated cylinders. Another means for deactivating the unneeded cylinders is to stop only the flow of fuel to the cylinder, which would advantageously deactivate the cylinder but would disadvantageously include pumping losses. Those skilled in the art, however, can appreciate that many means for deactivating combustion cylinders can be utilized while remaining within the scope of the present invention.

The method according to the present invention involves the use of cylinder deactivation at and near idle in a compression ignition premixed combustion engine, so that only some of the cylinders in the HCCI engine are firing, thereby increasing the effective load of the remaining firing cylinders, which advantageously allows the engine to remain operating in a stable combustion condition. The remaining activated cylinders are operated at a higher load condition at and near idle than would be the case if all cylinders were operating.

In operation, the multi-cylinder HCCI engine is operated normally, but the speed of the engine and the loads of the cylinders are monitored by the engine control system. If the cylinder load drops below the lowest allowed load at its current engine speed, the engine control system will deactivate a predetermined cylinder or cylinders. If the cylinder load exceeds the lowest allowed load at its current engine speed after the cylinder or cylinders has been deactivated, the engine control system maintains the current deactivated operation. If the cylinder load again drops below the lowest allowed load at its current engine speed, the engine control system will deactivate another predetermined cylinder or cylinders. The engine control system constantly monitors the engine speed and the cylinder load and activates and deactivates cylinders as necessary. The control system will continue to deactivate cylinders up to a predetermined number of cylinders that leaves activated the minimum number of cylinders that allow the engine to be run in a stable combustion condition. If the engine is operating with the minimum number of cylinders and the speed and the cylinder load remains below its lowest allowable load, the control system switches the engine to an alternate operating mode, such as (but not limited to) typical spark-ignited engine operation. The control system then monitors the engine speed and cylinder load until a range of speed and load is reached where HCCI operation can resume.

By incorporating HCCI operation into an engine, the engine can be developed with "lower-bound" NOx and particulate emissions, resulting in an engine that is nearly as efficient as a diesel with greatly reduced emissions constraints or a gasoline engine with fuel economy approaching that of a diesel engine. By incorporating the method according to the present invention into the control system of an HCCI engine, the HCCI engine can be advantageously operated with the combustion process controlled properly so that robust and stable combustion with low emissions, optimal heat release rate, and low noise can be achieved over a range of operating conditions, including low engine speed, low total engine load and low cylinder load.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
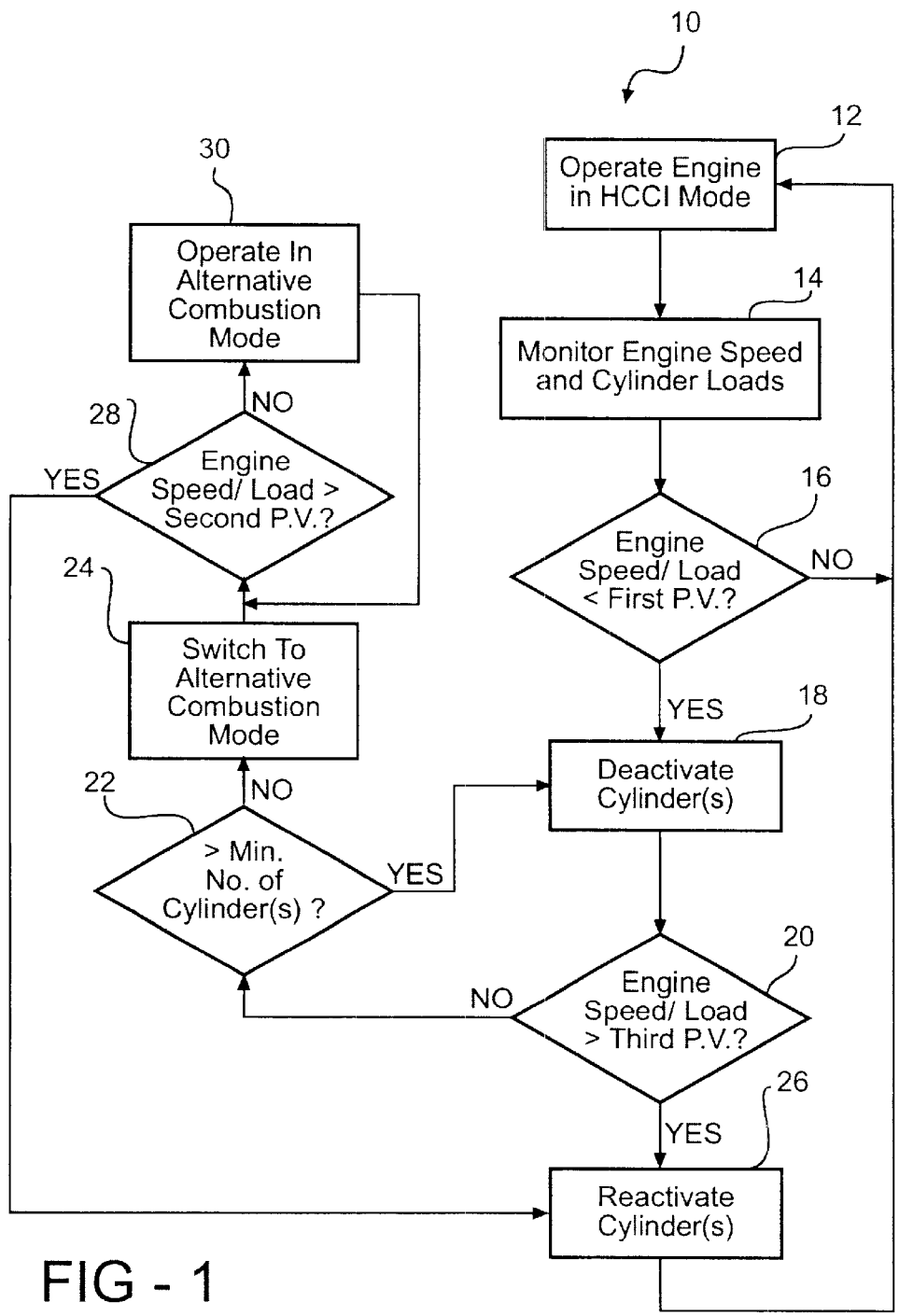
FIG. 1 is a flow diagram of a method for operating a HCCI engine at low speeds in accordance with the present invention.

Referring now to FIG. 1, a method for operating a multi-cylinder homogeneous charge compression ignition (HCCI) engine (not shown) having multiple activated combustion cylinders (not shown) is indicated generally at 10. The method 10 includes a step 12, where the engine is operated in a normal manner. The engine speed and the individual combustion cylinder loads are monitored (step 14), preferably by an engine control system (not shown), and the sensed speed and load are equal to measured values. In a step 16, the measured values of the engine speed and the cylinder loads are compared to a first predetermined values on the speed-load map of the engine equal to the lowest allowed load at its current engine speed where HCCI operation is possible. If the measured value of the cylinder load is greater than the first predetermined value equal to the lowest allowed load at its current engine speed, the method 10 returns to the step 14 to continue to monitor the engine speed and the cylinder loads of the engine.

If the measured value of the cylinder load is less than the first predetermined value equal to the lowest allowed load at its current engine speed, a predetermined number of cylinders are deactivated (step 18). After the predetermined number of cylinders has been deactivated in the step 18, the control system continues to monitor the engine speed and the cylinder loads to detect whether the cylinder load exceeds the predetermined value equal to the lowest allowed load at its current engine operating speed (step 20). If the measured value of the cylinder load is less than the lowest allowed load at its current engine speed, the control system next verifies (step 22) that the number of cylinders in operation is greater than a minimum number of cylinders required for the engine to operate. The minimum number of cylinders required for the engine to operate will depend upon the total number of cylinders and power required. If the engine is operating with greater than the minimum number of cylinders required, the method 10 returns to the step 18 and deactivates additional cylinder(s). If the engine is operating with the minimum number of cylinders and the cylinder load is below the lowest allowed load at its current engine speed, the control system switches the engine operation to an alternate combustion mode (step 24), such as (but not limited to) typical spark-ignited engine operation. The control system then monitors the engine speed and load (step 28) to determine if the engine speed and load is greater than a second predetermined value equal to an engine speed and load where HCCI mode operation is possible. If the engine speed and load is not greater than the second predetermined value, the engine continues to operate (step 30) in the alternate combustion mode. If the engine speed and load (step 28) is greater than the second predetermined value, the method 10 then reactivates all cylinders at step 26 and returns to the step 14, operating the engine in HCCI mode.

If the measured value of the cylinder load in the step 20 is detected to increase above a third predetermined value at its current operating speed, the control system reactivates (step 26) one or more cylinders. The third predetermined value is preferably a point on the speed-load map of the engine that is higher than the first predetermined value and equal to the lowest allowed load at the current operating speed. In this way, there is a high load set point (equal to the third predetermined value) and a low load set point (equal to the first predetermined value) at each engine speed or range of speeds, providing a "dead band" between the high load set point and the low load set point to allow the control system to operate the engine more smoothly when deactivating and activating the combustion cylinders. After the step 26, the method 10 returns to the step 14 to monitor the speed of the engine and the load of the cylinders. The method 10, therefore, continues to monitor the speed of the engine and the load of the cylinders while the engine remains in operation.

The control system in the step 18 preferably utilizes a means for temporarily deactivating a cylinder that includes, but is not limited to, stopping the flow of fuel and keeping both the intake and exhaust valves (not shown) closed on the cylinders to be deactivated. This means for temporarily deactivating the cylinder eliminates pumping losses due to intake into and exhaust from the deactivated cylinders. Another means for temporarily deactivating a cylinder is stopping only the flow of fuel to the cylinder, which would advantageously deactivate the cylinder but would disadvantageously include pumping losses. Those skilled in the art can appreciate that many means for temporarily deactivating combustion cylinders can be utilized while remaining within the scope of the present invention.

Figure 2:
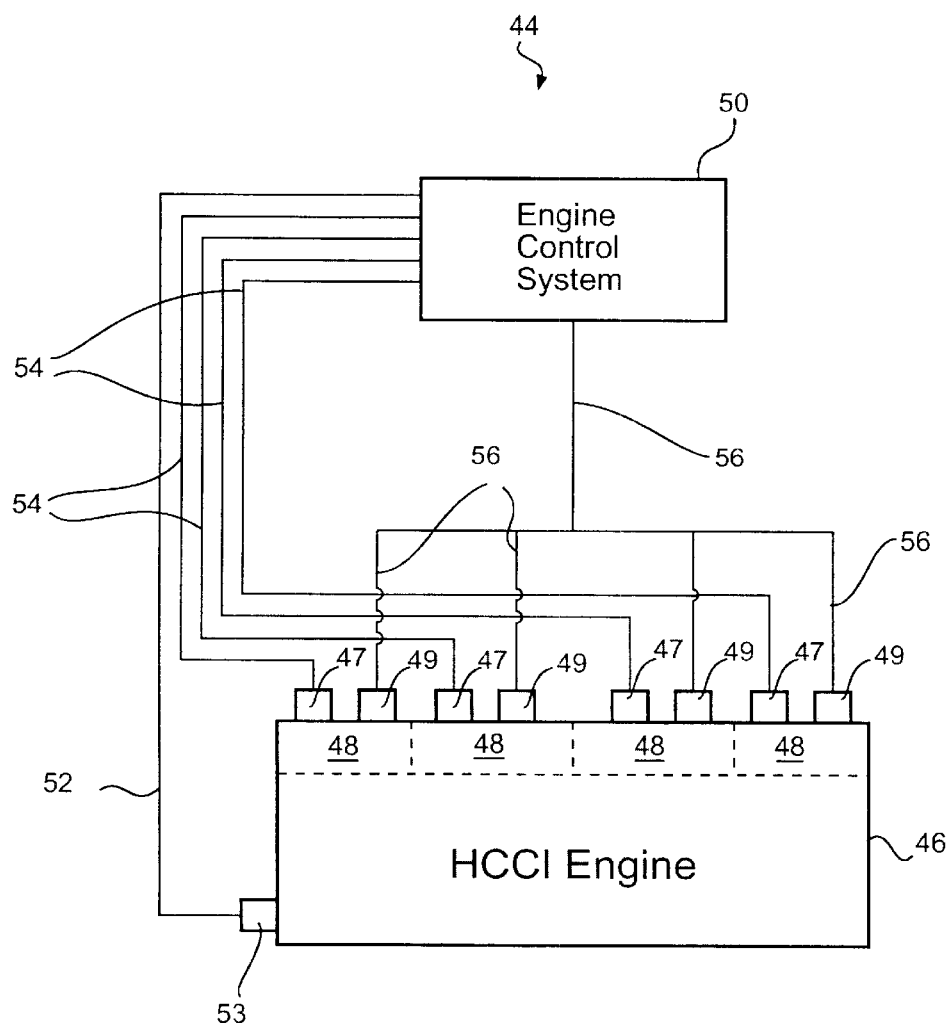
FIG. 2 is a block diagram of an apparatus for operating a HCCI engine at low speeds in accordance with the present invention.

Referring now to FIG. 2, an apparatus for operating a HCCI engine at low speeds and loads in accordance with the present invention is indicated generally at 44. The apparatus 44 includes an HCCI engine 46 having a plurality of combustion cylinders 48. Each of the combustion cylinders 48 includes an activator 49. Each of the activators 49 is operable to deactivate or activate an associated combustion cylinder 48. An engine control system 50 receives a signal on a line 52 from a sensor 53 on the engine 46. The signal generated by the sensor 53 is preferably an engine speed signal. The engine control system 50 also receives a signal on a line 54 from a sensor 47 on each of the combustion cylinders 48 or at another location where it is advantageous to measure the load on each individual cylinder and/or the total engine load. The signal generated by the sensors 47 is preferably a cylinder load signal, or a signal which can be directly related to the cylinder load.

In operation, the engine 46 is operated normally and transmits the engine speed signal from the sensor 53 on the line 52 to the control system 50, and the combustion cylinders 48 transmit the cylinder load signals from the sensors 47 on the lines 54 to the control system 50. When the cylinder load or loads drop below the first predetermined value equal to the lowest allowed load at the current engine speed, the control system 50 sends a signal on the line 56 to an activator 49 to deactivate one or more of the combustion cylinders 48. When the cylinder load or loads exceeds the third predetermined value at the current engine operating speed, the control system sends a signal on the line 56 to the activator 49 to reactivate the previously deactivated combustion cylinder or cylinders 48.

By incorporating HCCI into an engine, the engine can be developed with "lower-bound" NOx and particulate emissions, resulting in an engine that is nearly as efficient as a diesel with greatly reduced emissions constraints or a gasoline engine with fuel economy approaching that of a diesel engine. By incorporating the method 10 or 30 into the control system of the HCCI engine, the HCCI engine can be advantageously operated with the combustion process controlled properly so that robust and stable combustion with low emissions, optimal heat release rate, and low noise can be achieved over a range of operating conditions, including low speed and load.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for operating a multi-cylinder homogeneous charge compression ignition (HCCI) engine at low engine speeds and loads, the method comprising the steps of:
    a) monitoring an operating speed and a cylinder load of an HCCI engine having multiple activated cylinders in a stable combustion condition;
    b) deactivating at least one cylinder when a cylinder load drops below a predetermined value equal to the lowest allowed load at a current engine operating speed to maintain stable combustion in the remaining activated cylinders; and
    c) reactivating the at least one cylinder when the cylinder load exceeds another predetermined value.

2. The method according to claim 1 wherein step b) is performed by stopping the flow of fuel and keeping all intake valves and all exhaust valves closed on the at least one cylinder to be deactivated.

3. The method according to claim 2 wherein step c) is performed by starting the flow of fuel and allowing normal operation of both the intake and exhaust valves on the at least one cylinder deactivated in step b).

4. The method according to claim 1 wherein step b) is performed by stopping the flow of fuel to the at least one cylinder.

5. The method according to claim 4 wherein step c) is performed by starting the flow of fuel to the at least one cylinder deactivated in step b).

6. The method according to claim 1 wherein steps a), b), and c) are performed by an engine control system.

7. A method for operating a multi-cylinder homogeneous charge compression ignition engine at low speeds and loads, the engine having a plurality of activated combustion cylinders, said method comprising the steps of:
    a) monitoring at least one operating parameter of the engine;
    b) deactivating at least one cylinder when a value of the at least one operating parameters of the engine drops below a predetermined value;
    c) reactivating the at least one cylinder when the at least one operating parameter of the engine exceeds another predetermined value; and
    d) repeating steps a) through c) to maintain the at least one operating parameter at or above the predetermined value while the engine is operating.

8. The method according to claim 7 wherein the at least one operating parameter is one of engine speed, total engine load, and cylinder load.

9. The method according to claim 7 wherein steps a), b), and c) are performed by an engine control system.

10. The method according to claim 7 wherein step b) is performed by stopping the flow of fuel and keeping all intake and exhaust valves closed on the at least one cylinder to be deactivated.

11. The method according to claim 10 wherein step c) is performed by starting the flow of fuel and allowing normal operation of all the intake and exhaust valves on the at least one cylinder deactivated in step b).

12. The method according to claim 7 wherein step b) is performed by stopping the flow of fuel to the at least one cylinder.

13. The method according to claim 7 wherein step c) is performed by starting the flow of fuel to the at least one cylinder deactivated in step b).

14. The method according to claim 7 including a step performed after step b) and prior to step c) of switching the engine to an alternate combustion mode if the engine is operating with a minimum number of cylinders and the operating parameter is below the predetermined value.

15. An apparatus for operating a multi-cylinder homogeneous charge compression ignition (HCCI) engine at low engine speeds and loads, said apparatus comprising:

at least one sensor connected to an HCCI engine having multiple activated cylinders in a stable combustion condition, said at least one sensor operable to monitor one or more operating parameters of the HCCI engine; and a control system connected to said at least one sensor and operable to receive said operating parameters from said at least one sensor, whereby said control system is operable to deactivate at least one cylinder when the one or more engine operating parameters drops below a first predetermined value to maintain the stable combustion in the remaining activated cylinders and said control system is operable to reactivate the at least one cylinder when the one or more engine operating parameters exceeds a second predetermined value.

16. The apparatus according to claim 15 wherein the operating parameter is one of engine speed and cylinder load.

17. The apparatus according to claim 15 wherein said control system deactivates the at least one cylinder by stopping the flow of fuel and closing all the intake and all the exhaust valves on the cylinder to be deactivated.

18. The apparatus according to claim 17 wherein said control system reactivates the at least one cylinder by starting the flow of fuel and allowing normal operation of all the intake and all the exhaust valves on the deactivated cylinder.

19. The apparatus according to claim 15 wherein said control system deactivates the at least one cylinder by stopping the flow of fuel to the cylinder.

20. The apparatus according to claim 19 wherein said control system reactivates the at least one cylinder by starting the flow of fuel to the deactivated cylinder.

* * * * *